(12) United States Patent
Lee

(10) Patent No.: US 11,006,275 B1
(45) Date of Patent: May 11, 2021

(54) SYSTEM AND METHOD FOR CONNECTED VEHICLE CONTROL

(71) Applicants: HYUNDAI MOTOR COMPANY, Seoul (KR); KIA MOTORS CORPORATION, Seoul (KR)

(72) Inventor: Jeongtae Lee, Suwon-si (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 0 days.

(21) Appl. No.: 16/703,606

(22) Filed: Dec. 4, 2019

(30) Foreign Application Priority Data

Nov. 7, 2019 (CN) .......................... 201911083255.8

(51) Int. Cl.
| | | |
|---|---|---|
| G05B 19/00 | (2006.01) | |
| G05B 23/00 | (2006.01) | |
| G06F 7/00 | (2006.01) | |
| G08B 29/00 | (2006.01) | |
| G08C 19/00 | (2006.01) | |
| H04B 1/00 | (2006.01) | |
| H04B 3/00 | (2006.01) | |
| H04Q 1/00 | (2006.01) | |
| H04Q 9/00 | (2006.01) | |
| H04W 12/06 | (2021.01) | |
| H04W 12/04 | (2021.01) | |
| H04W 4/40 | (2018.01) | |

(Continued)

(52) U.S. Cl.
CPC ........... *H04W 12/068* (2021.01); *B60R 25/24* (2013.01); *H04W 4/40* (2018.02); *H04W 4/80* (2018.02); *H04W 12/04* (2013.01); *H04W 12/082* (2021.01); *H04W 12/71* (2021.01); *B60R 2325/101* (2013.01); *B60R 2325/205* (2013.01)

(58) Field of Classification Search
CPC ..... H04W 12/0608; H04W 4/80; H04W 4/40; H04W 12/0802; H04W 12/00512; H04W 12/04; B60R 25/24; B60R 2325/101; B60R 2325/205
USPC ......................................................... 340/5.8
See application file for complete search history.

(56) References Cited

U.S. PATENT DOCUMENTS

| | | | |
|---|---|---|---|
| 10,589,720 B1 * | 3/2020 | Tang | ...................... B60R 25/241 |
| 2013/0179005 A1 * | 7/2013 | Nishimoto | .............. B60R 25/24 |
| | | | 701/2 |

(Continued)

FOREIGN PATENT DOCUMENTS

| | | |
|---|---|---|
| JP | 6181336 B1 | 8/2017 |
| KR | 10-1615519 B1 | 4/2016 |
| KR | 20180054775 A | 5/2018 |

*Primary Examiner* — Tanmay K Shah
(74) *Attorney, Agent, or Firm* — Brinks Gilson & Lione

(57) ABSTRACT

A system for connected vehicle control may include a communicator configured to connect with a user terminal though wireless communication, and generate authentication information by combining user terminal information and vehicle information, a head unit having a password for operation and configured to generate a visible code by converting the authentication information, a body controller configured to control the vehicle according to a remote control signal sent according to a remote control function of a user application installed in the user terminal, and a controller configured to connect the communicator, the head unit, and the user application through the wireless communication, authenticate, and register.

19 Claims, 10 Drawing Sheets

(51) Int. Cl.
*H04W 4/80* (2018.01)
*B60R 25/24* (2013.01)
*H04W 12/71* (2021.01)
*H04W 12/082* (2021.01)

(56) References Cited

U.S. PATENT DOCUMENTS

2014/0359272 A1* 12/2014 Hiltunen .................. G09C 1/00
713/150
2019/0066424 A1* 2/2019 Hassani .................. B60R 25/04

* cited by examiner

Prior Art

SYSTEM AND METHOD FOR CONNECTED VEHICLE CONTROL

CROSS-REFERENCE TO RELATED APPLICATION

The present application claims priority to and the benefit of Chinese Patent Application No. 201911083255.8 filed on Nov. 7, 2019, which is incorporated herein by reference in its entirety.

TECHNICAL FIELD

The present disclosure relates to a system and connected vehicle control method.

BACKGROUND

The statements in this section merely provide background information related to the present disclosure and may not constitute prior art.

In the past, most of vehicles were to be opened/closed or started only with inserting a key into the door or key box, but recently, vehicles applying system using smartkey, so that door opening/closing or engine starting is available even without inserting the key or pressing a button but only with having the key are gradually increased.

Meanwhile, as a research for the connected vehicle is recently increased, smartkey-free systems are being developed or launched in which the user opens/closes the door or starts the vehicle using a smartphone possessed by the user without using the smartkey.

Representative methods include technologies using Near Field communication (NFC) and Bluetooth low energy (BLE) communication of smartphones.

Here, since the NFC is a method in which the user is directly in contact with the smartphone, it is excellent in security, but has a disadvantage in that a communication distance is short and has problems that it is inconvenient to use the NFC because the user should be in contact with the smartphone (NFC) every time to open or close the door or starting the vehicle. The cost of related parts for recognition is also increased.

On the other hand, since these problems can be solved by applying BLE communication technology, smartkey-free system using the BLE communication has been recently spotlighted.

FIG. 1 is an illustrative view illustrating a connected vehicle control system using a conventional BLE and a problem thereof.

Referring to FIG. 1, a conventional connected vehicle control system with conventional smartkey-free system is connected to a smartphone of a user through BLE communication to remotely control the vehicle.

However, since the BLE operates at a communication distance within about 100 m based on BT ver4.2, there are problems that it is vulnerable to security and the doors may be opened or vehicle may be started by others when a signal is hacked within the above-mentioned distance.

Therefore, in developing the smartkey-free system using BLE communication, there is a strong demand for a method for further improving security.

Particularly, to share the remote control authority of one connected vehicle with multiple smartphones, additional technology for security is required.

In the prior art, a system having a separate central server is provided, to register one or a plurality of smartphones to the central server, and to grant the authority for controlling the connected vehicle to the smartphone whose information is registered in the central server.

However, such a system requires server construction and operation, database development and management, and a lot of costs are required for development and maintenance.

SUMMARY

The present disclosure provides system and method for connected vehicle control having an improved security without employing a separate central server.

In one form of the present disclosure, a system for connected vehicle control includes a communication unit, a head unit, a body control module, and a controller. The communication unit may be configured to connect with a user terminal though wireless communication, and generate authentication information by combining information of the user terminal and vehicle information. The head unit may have a password for operation and may be configured to generate a visible code by converting the authentication information. The body control module may be configured to control the vehicle according to a remote control signal sent according to a remote control function of a user application installed in the user terminal, the user application being capable of scanning the visible code, loading the authentication information, registering the vehicle information, and having the remote control function regarding the vehicle of which information is registered. The controller may be configured to control wireless communication connection, authentication, and registration between the communication unit, the head unit, and the user application. The vehicle information may include at least a vehicle identification number (VIN), and a plurality of authentication keys. The information of the user terminal may include at least a terminal identification code defined uniquely for each user terminal. The remote control signal may be received from the user terminal by the remote control function activated as the user terminal is connected to the communication unit through the wireless communication after the user terminal is registered in the head unit and the vehicle information is registered in the user application. The head unit may be configured to register a plurality of user terminals, and in the registration procedure, to separately register or deregister the plurality of user terminals into one master terminal and a plurality of guest terminals, in a plurality of categories of registration including new registration, re-registration, and replacing registration.

When the user terminal is to be newly registered as the master terminal, the controller may be configured to perform, checking whether an already registered master terminal exists in the head unit, proceeding the registration procedure when the already registered master terminal does not exists, and stopping the registration procedure when the already registered master terminal exists.

When the user terminal is to be re-registered as the master terminal, the controller may be configured to perform, checking whether an already registered master terminal exists in the head unit, checking whether a terminal identification code of the already registered master terminal is identical to a terminal identification code of the user terminal when the already registered master terminal exists, proceeding the registration procedure when the terminal identification code of the already registered master terminal is identical to the terminal identification code of the user terminal, and stopping the registration procedure when the already registered master terminal does not exists or when the terminal identification code of the already registered master terminal is not identical to the terminal identification code of the user terminal.

When the user terminal is to be replacing-registered as the master terminal, the controller may be configured to perform, checking whether an already registered master terminal exists in the head unit, requesting a replacing registration approval to a master application installed in an existing master terminal when the already registered master terminal exists, proceeding the registration procedure when the replacing registration is approved by the master application, stopping the registration procedure when the already registered master terminal does not exists or when the replacing registration is not approved by the master application, and deregistering the existing master terminal when the user terminal is replacing-registered as the master terminal.

When the user terminal is to be newly registered as the guest terminal, the controller may be configured to perform, checking whether an already registered master terminal exists in the head unit, requesting an approval of a new registration of the guest terminal and a limited authority range setting, to a master application of an existing master terminal, when the already registered master terminal exists, proceeding the registration procedure when the new registration of the guest terminal is approved and the limited authority range is set by the master application, stopping the registration procedure when the already registered master terminal does not exists or when the new registration is not approved by the master application. The limited authority range may include a permission period of the guest terminal and a permitted range of the remote control function activated by a guest application installed in the guest terminal.

When the user terminal is to be re-registered as the guest terminal, the controller may be configured to perform, checking whether at least one already registered guest terminal exists in the head unit, checking whether there is any terminal identification code of an existing guest terminal that matches the terminal identification code of the user terminal when the already registered guest terminal exists, proceeding the registration procedure when there is a terminal identification code of the existing guest terminal that matches the terminal identification code of the user terminal, and stopping the registration procedure when there is not a terminal identification code of the existing guest terminal that matches the terminal identification code of the user terminal.

When deregistering the user terminal registered in the head unit, the controller may be configured to delete the information of the user terminal from the head unit and to delete the vehicle information from the user application.

The head unit may be configured to set an initial password set at a vehicle production stage as the password for operation, and to set a user-designated password as the password for operation when the user-designated password is received from the user application after checking the initial password.

The communication unit may be implemented by Bluetooth low energy (BLE). The communication unit may include at least one communication antenna for radiating a signal to an outside and an inside of the vehicle to connect wireless communication with the application, and a communication control module that receives the remote control signal sent from the user application and transmits the received signal to the body control module when the user application is registered in the head unit.

The terminal identification code may be a media access control (MAC) address. The plurality of authentication keys may include a one-time password (OTP) authentication key capable of generating a password in combination of at least temporal information.

An exemplary connected vehicle control method is for controlling a connected vehicle control system that includes a communication unit configured to connect to a user terminal through wireless communication, a head unit configured to display a visible code, a body control module configured to control the vehicle according to a remote control signal sent by a remote control function of a user application installed in the user terminal, and a controller configured to control wireless communication connection, authentication, and registration between the communication unit, the head unit, and the user application. The connected vehicle control method may include connecting with the user terminal through the wireless communication by the communication unit, receiving the information of the user terminal from the user application through the communication unit, receiving the password for operation from the user terminal and storing the received password, determining a category of registration, generating authentication information by combining the vehicle information and the information of the user terminal received by the communication unit, generating a visible code by converting the authentication information and displaying the visible code through the head unit, and registering the user terminal when the user application scans the visible code and load the authentication information, When the category of the registration is a new registration of the master terminal, the exemplary method may further include, determining whether an already registered master terminal exists. The generating of the authentication information may be performed when the already registered master terminal does not exist, and The new registration of the master terminal may be stopped when the already registered master terminal exists.

When the category of the registration is a re-registration of the master terminal, the exemplary method may further include, determining whether an already registered master terminal exists, and checking whether a device identification code of an existing master terminal matches a device identification code of the user terminal to be re-registered. The generating of the authentication information may be performed when the already registered master terminal exists and the device identification code of the existing master terminal matches the device identification code of the user terminal to be re-registered, and The re-registration of the master terminal may be stopped when the already registered master terminal does not exists or when the device identification code of the existing master terminal does not match the device identification code of the user terminal to be re-registered.

When the category of the registration is a replacing registration of the master terminal, the exemplary method may further include, determining whether an already registered master terminal exists, requesting an approval of the replacing registration from a user application of an existing master terminal, and receiving the approval of the replacing registration from the user application of the existing master terminal. The generating of the authentication information may be performed when the already registered master terminal exists and the replacing registration is approved by the user application of the existing master terminal. The replacing registration of the master terminal may be stopped when the already registered master terminal does not exists or when the replacing registration is not approved by the user application of the existing master terminal.

When the category of the registration is a new registration of the guest terminal, the exemplary method may further include, determining whether an already registered master terminal exists, requesting an approval of registering a guest terminal from the user application of the master terminal, receiving a limited authority range setting permitted to the guest terminal from a user application of an existing master terminal, and receiving the approval of registering the guest terminal from the user application of the existing master terminal. The limited authority range may include a permission period of the guest terminal and a permitted range of the remote control function activated by a guest application installed in the guest terminal. The generating of the authentication information may be performed when the already registered master terminal exists and the registration of the guest terminal is approved. The new registration of the guest terminal may be stopped when the already registered master terminal does not exists or when the registration of the guest terminal is not approved.

When the category of the registration is a re-registration of the guest terminal, the exemplary method may further include, checking whether an already registered guest terminal exists, and checking whether a device identification code of an existing guest terminal matches a device identification code of the user terminal to be re-registered. The generating of the authentication information may be performed when the already registered guest terminal exists and the device identification code of the existing guest terminal matches the device identification code of the user terminal to be re-registered. The re-registration of the guest terminal may be stopped when the already registered guest terminal does not exists or when the device identification code of the existing guest terminal does not match the device identification code of the user terminal to be re-registered.

When the category of the registration is deregistration of a registered user terminal, the exemplary method may further include, receiving the password for operation from the user and checking an authorized user based on the received password, receiving a selection information of a terminal to be deregistered from at least one registered terminal registered, and deleting the information of the user terminal selected by the user.

The receiving of the password for operation from the user terminal and storing the received password may include receiving an initial password set in a vehicle production step as a password for operation when the head unit is initially driven, guiding the user to input a user-designated password when the initial password is correctly input, and setting the user-designated password as the password for the operation when the user-designated password is received.

The terminal identification code may be a media access control (MAC) address. The plurality of authentication keys may include a one-time password (OTP) authentication key capable of generating a password in combination of at least temporal information.

In some forms of the present disclosure, in a connected service vehicle to which a smartkey-free system using BLE communication is applied, by providing a separate authentication condition to which an information of smart devices, without relying only on the security solution of the BLE communication itself, It can reduce the possibility of car takeover by hacking and improve the security of the system.

In addition, in a connected vehicle control system that controls a connected service vehicle through a plurality of smart devices, security may be improved without a separate central server.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
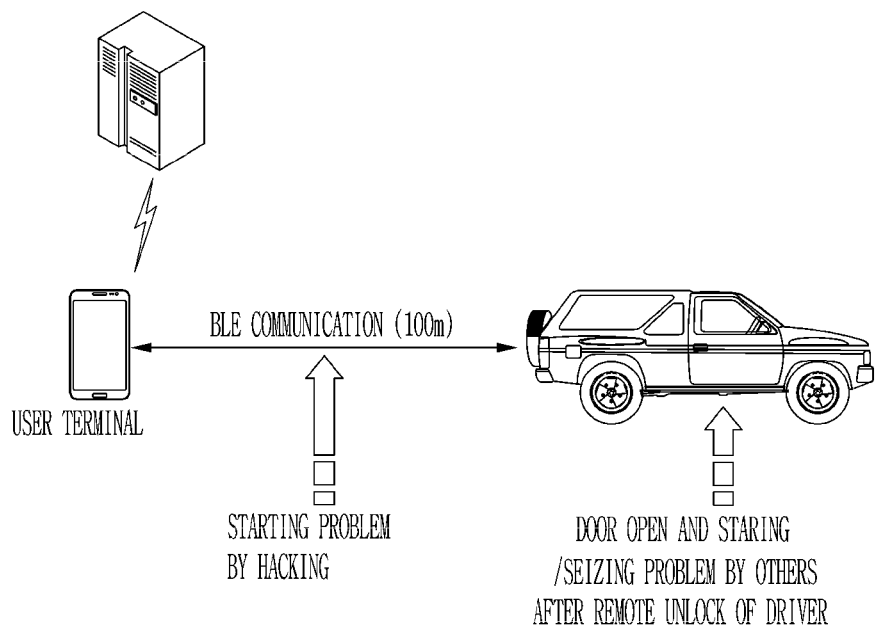
FIG. 1 is an illustrative view illustrating a connected vehicle control system using a conventional BLE and a problem thereof.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the specification, unless explicitly described to the contrary, the word "may include" and variations such as "may include" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Vehicles, automobiles or other similar terms used throughout the specification includes sports utility vehicles (SUVs), buses, trucks, cars including various commercial vehicles, ships including various kinds of boats and vessels, aircraft, and vehicles similar thereto, and includes hybrid vehicles, electric vehicles, plug-in hybrid electric vehicles, hydrogen fuel vehicles, and other alternative fuel (e.g., fuel obtained from sources other than oil) vehicles.

Hereinafter, a system and method for a connected vehicle control in some forms of the present disclosure will be described in detail with reference to the accompanying drawings.

Figure 2:
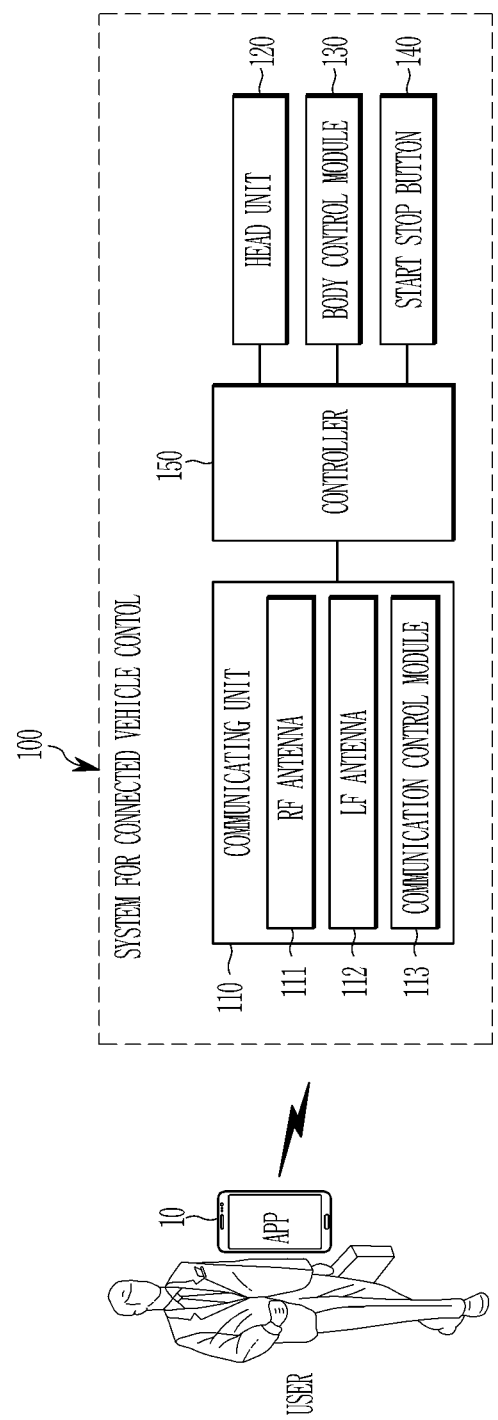
FIG. 2 is a block diagram schematically illustrating a connected vehicle control system in one form of the present disclosure.

FIG. 2 is a block diagram schematically illustrating a connected vehicle control system in some forms of the present disclosure.

Referring to FIG. 2, a connected vehicle control system 100 in some forms of the present disclosure includes a communication unit 110, a head unit 120, a body control module (BCM) 130, a start-stop button (SSB) 140, and a controller 150.

Figure 3:
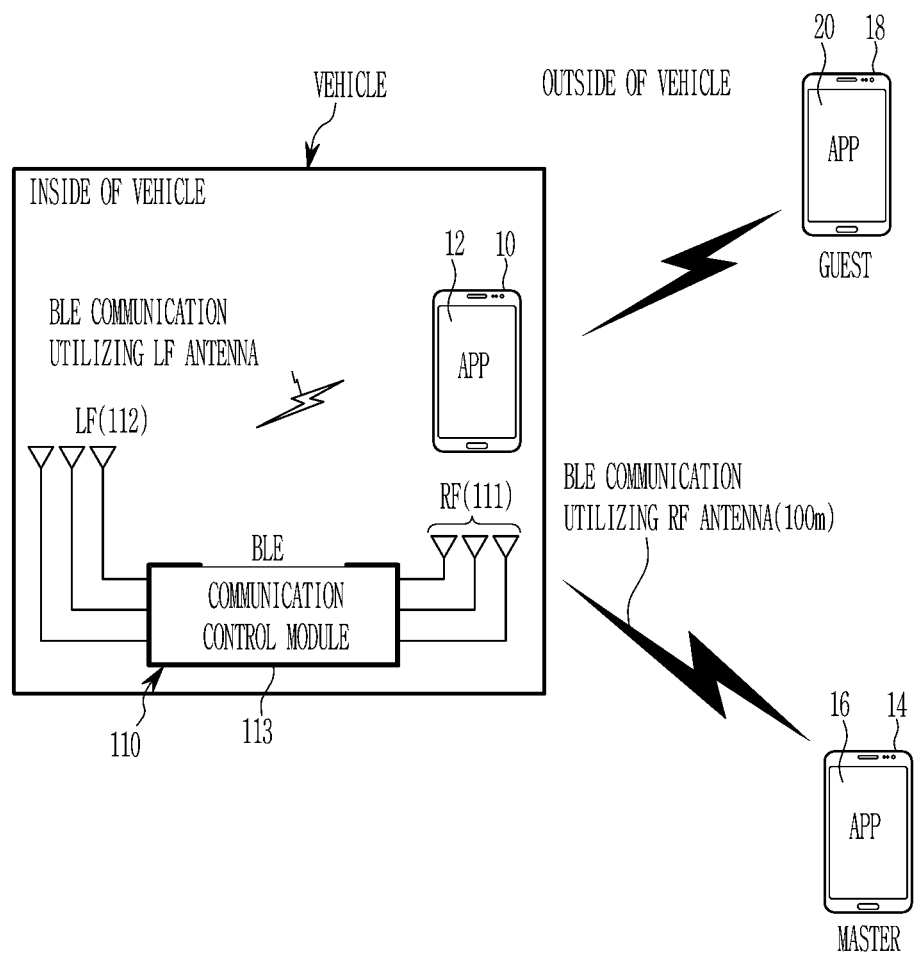
FIG. 3 is a schematic view illustrating communication between a communication unit and a user application in one form of the present disclosure.

The communication unit 110 is connected to a user application 12 (as illustrated in FIG. 3) installed in a user terminal 10 by wireless communication, and performs communication for supporting a smartkey-free control function of a vehicle.

The user terminal 10 is an information communication terminal possessed by a user, not necessarily limited to those illustrated herein, but may be a smart phone, a wearable terminal, a notebook computer, a tablet PC, etc., which is capable of wireless communication with the communication unit 110.

For example, the communication unit 110 includes Bluetooth low energy (BLE) and the BLE may communicate with the user terminal 10 within about 100 m based on BT ver4.2. The BLE is not limited to the BT ver4.2 version allowing other upper/lower versions may be applied, and a communication distance may be changed accordingly.

The communication unit 110 may be mounted in an audio, video, navigation (AVN) or a telematics unit, and may include a radio frequency (RF) antenna 111 and a communication control module 113.

The communication unit 110 may further include a low frequency (LF) antenna 112 for short-range wireless communication.

The RF antenna 111 radiates an RF signal around the vehicle within about 100 meters based on BT ver4.2 and is connected to the user terminal 10 existing outside or inside the vehicle by wireless communication.

The LF antenna 112 radiates an LF signal to an interior of the vehicle and is connected to the user terminal 10 existing in the interior of the vehicle by short-range wireless communication.

The communication control module 113 controls an overall operation for connecting the user application 12 with BLE communication through the RF antenna 111 and the LF antenna 112.

The communication control module 113 generates or stores authentication information for connecting wireless communication with the user terminal 10.

The head unit 120 has a predetermined password for operation, so that registration of vehicle information to the user application 12 becomes available only when the predetermined password is input to the head unit 120.

The predetermined password for operation may be a PIN code consisting of six digits. The predetermined password may be set as an initial password that is set during vehicle production, or a user-designated password that is set by the user.

The head unit 120 generates a visible code (e.g. QR code) by converting the authentication information and displays the generated visible code. The user application 12 scans and interprets the visible code, loads the authentication information, and stores it. For example, the head unit 120 may be any device that is installed in the vehicle and includes a display, such as an audio or navigation device.

The body control module 130 controls the vehicle according to a remote control signal transmitted by a remote control function of the user application 12.

Particularly, the body control module 130 performs the vehicle control such as the door-unlock and the door-lock according to the remote control signal received from the communication unit 110.

In addition, the body control module 130 may further control the vehicle, such as opening of a tail gate, opening of a door window, and activating an emergency light, and outputting an alarm sound for notifying a parking location of the vehicle, according to a command of the remote control signal. The command may be input according to the remote control function of the user application 12.

The start-stop button 140 generates a start-on signal in response to a button input when the vehicle is turned off, and generates a turn-off signal in response to a button input in a state in which the vehicle is started.

The controller 150 controls an overall operation of a connected vehicle control in some forms of the present disclosure, and includes hardware, programs, and data for the control. To this end, the controller 150 may be implemented as at least one processor that is operated by a predetermined program, and the predetermined program may include a set of instructions to perform each step of a connected vehicle control method in some forms of the present disclosure.

The controller 150 may include a smartkey controller (SMK) to which a smartkey-free starting control function is added, but is not limited thereto, and may also include an electronic control unit (ECU) of a superordinate concept controlling a variety of controllers provided to operate the vehicle, including the smartkey controller.

The controller 150 may control the communication unit 110 and the head unit to perform wireless communication, authentication, and registration with the user application 12 of the user terminal 10.

The controller 150 may be configured to start the vehicle according to the remote control function of the user application 12.

Alternatively, the controller 150 may determine whether to start the vehicle according to the start-on signal according to the authentication state with the user application 12.

The controller 150 transmits the start-on signal to a driving power source (not shown) of the vehicle and initiates the starting of the power source. Here, the driving power source may be any one or a combination of an engine, a driving motor, and a fuel cell stack according to a kind of the vehicle and an operation thereof may be initiated according to the start-on signal.

In addition, it is apparent that the controller 150 may further check whether usual starting conditions of an existing smartkey controller are satisfied, when the signal of the start-stop button 140 is input. The usual starting conditions may include whether a transmission is in a P or N state, whether a brake is under operation, whether the smartkey is inside the vehicle, or a combination thereof.

FIG. 3 is a schematic view illustrating communication between a communication unit and a user application in some forms of the present disclosure.

Referring to FIG. 3, the communication unit 110 may include four multi-input systems based on BT ver.4.2, and may include one or more RF antennas 111 for remote communication outside the vehicle and one or more LF antenna 112 for short-range communication inside the vehicle. The RF antennas and the LF antennas may be provided in different numbers.

The RF antenna 111 is a basic antenna of BLE, through which communication control module 113 of the communication unit 110 connects wireless communication with a user application 12 of a user terminal 10 within 100 meters, which is typically a maximum communication sensing distance.

The LF antenna 112 connects short-range wireless communication with the user application of the user terminal 10 existing inside the vehicle. Here, the LF antenna 112 forms a communication region for Bluetooth communication inside the vehicle, and serves as an indoor antenna for searching for whether the user terminal 10 exists inside the vehicle.

The communication control module 113 connects wireless communication with a user application 12 of a user terminal 10 within the communication sensing distance of the RF antenna 111, and receives information of a user terminal 10 through the wireless communication.

The information of the user terminal 10 includes a terminal identification code which is unique to each user terminal. For example, the terminal identification code may be a media access control (MAC) address The MAC address may consist of a total of 48 bits, and may be set differently for each terminal during terminal production.

The communication control module 113 generates authentication information by combining the information of the user terminal 10 and the vehicle information. The head unit 120 converts the authentication information into a visible code that may be scanned. When the user application 12 scans and interprets the visible code, the user terminal 10 may be registered in the head unit 120.

When the user terminal 10 is registered in the head unit 120, a remote control function on the connected vehicle is activated on the user application 12. That is, the remote control function of the user terminal 10 is activated only when a validity of the authentication information is confirmed by the head unit 120 during registration of the user terminal 10.

For example, the remote control function of the user application 12 may include door lock/unlock function so that the user can remotely lock or unlock the door of the vehicle. In detail, the communication control module 113 may receive the door lock/undock signal transmitted from the user application 12 through the RF antenna 111, and transmit the received signal to the body control module 130. Then, the body control module 130 may remotely lock or unlock the door of the vehicle according to the door lock/undock signal.

The head unit 120 may accept registration of a plurality of user terminals 10. More particularly, the head unit 120 may differentiate a master terminal 14 or a guest terminal 18 when registering the terminal. Only one master terminal 14 may be registered, and a plurality of guest terminals 18 may be registered.

Registration of the guest terminal 18 cannot be performed alone. Particularly, the guest terminal 18 can be registered only when the master terminal 14 is already registered, and the master terminal 14 approves the registration of the guest terminal 18.

Here, the user may designate a limited authority range granted to the guest application 20 installed in the guest terminal 18. For example, the limited authority range can be set, e.g., by limiting a permission period, or by limiting a scope of the remote control function available to the guest terminal. Particularly, the user may set the guest terminal 18 to use only the door lock and unlock function for only two months. When the permission period has elapsed, the guest terminal 18 is deregistered from the head unit 120.

Some forms of the present disclosure provide an authentication process between the user terminal and the communication control module, which checks matching of the terminal identification code, such as MAC address.

That is, the system 100 for a connected vehicle control in some forms of the present disclosure may improve security of a vehicle control because a remote control function is not activated in the case that the terminal identification code is not matched, even though a corresponding signal is sniffed by a hacking of an intruder in a state in which the communication unit 110 is connected to the user terminal through RF antenna 111.

In addition, in some forms of the present disclosure, a plurality of user terminals may be registered in the head unit of the connected vehicle to provide a remote control function of the connected vehicle for a plurality of users. Therefore, according to an exemplary connected vehicle control system, a connected vehicle control becomes available for a plurality of user terminals without employing a separate server.

On the other hand, a connected vehicle control method in some forms of the present disclosure based on the configuration of the connected vehicle control system 100 described above will be described with reference to FIGS. 4 to 10.

Figure 4:
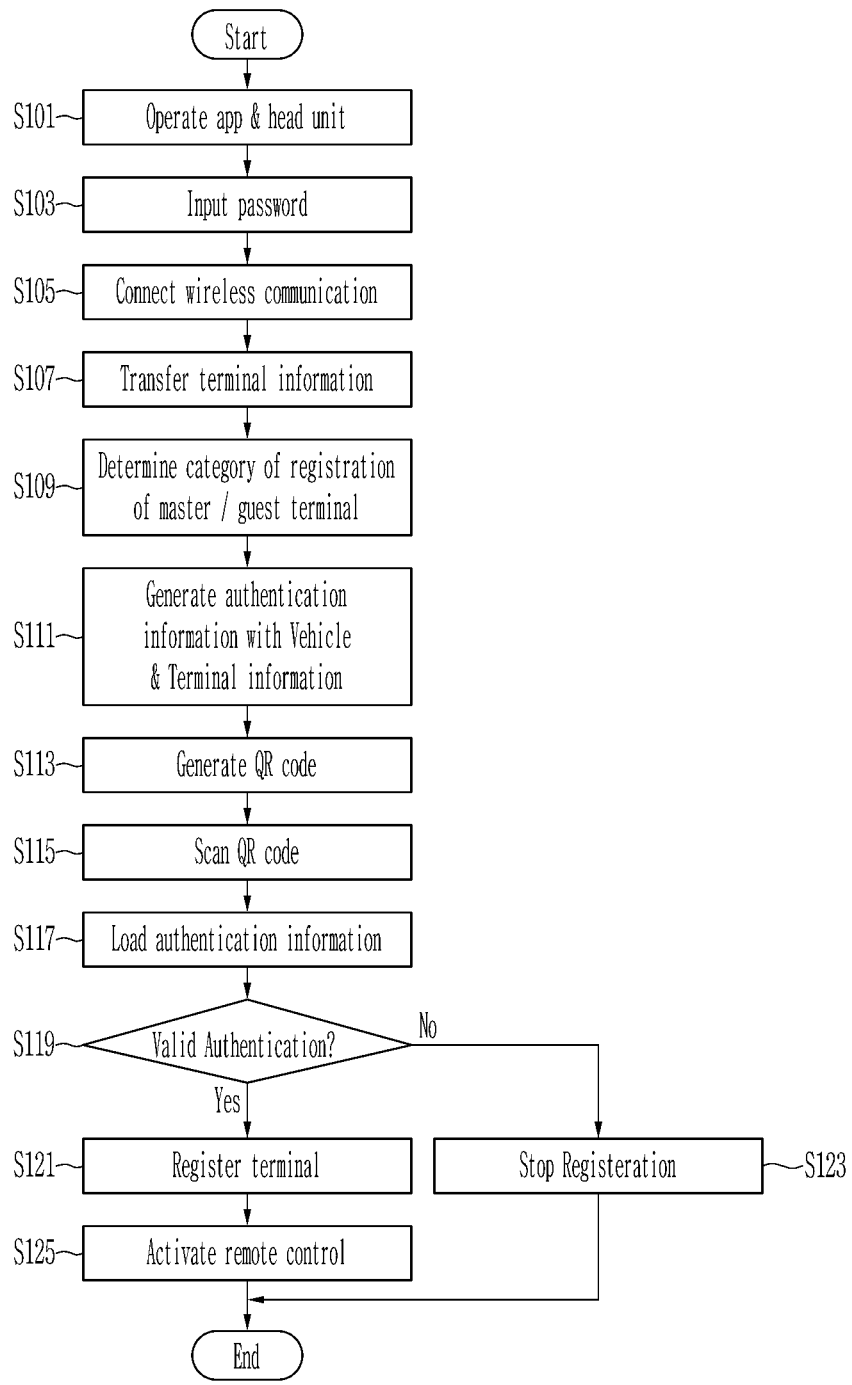
FIG. 4 is a flowchart schematically illustrating a connected vehicle control method in one form of the present disclosure.
Figure 5:
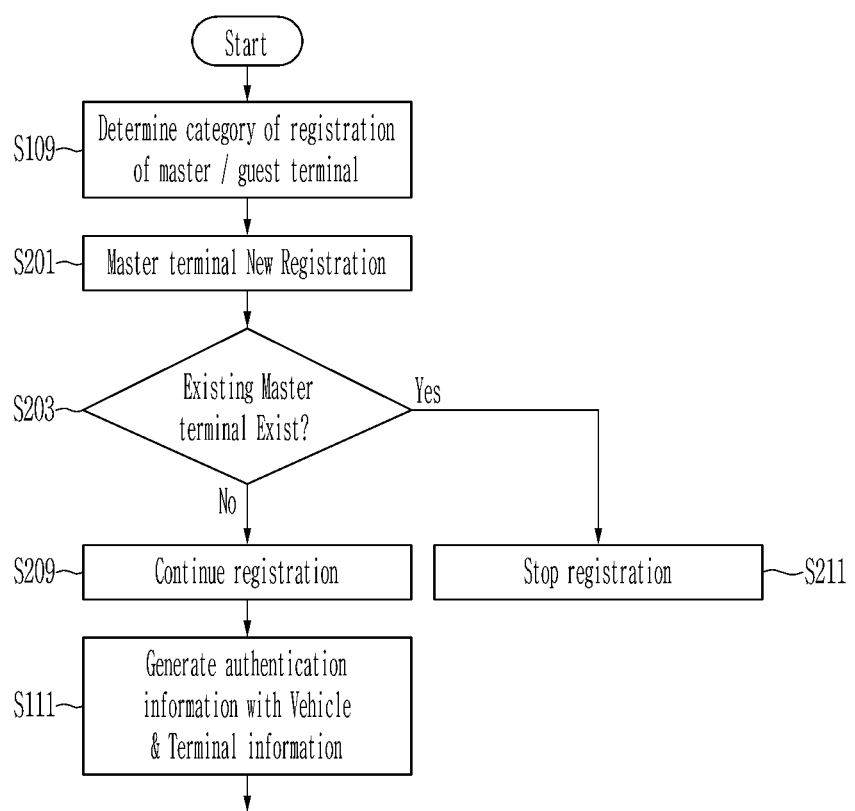
FIG. 5 is a flowchart schematically illustrating a new registration of a master terminal in one form of the present disclosure.
Figure 6:
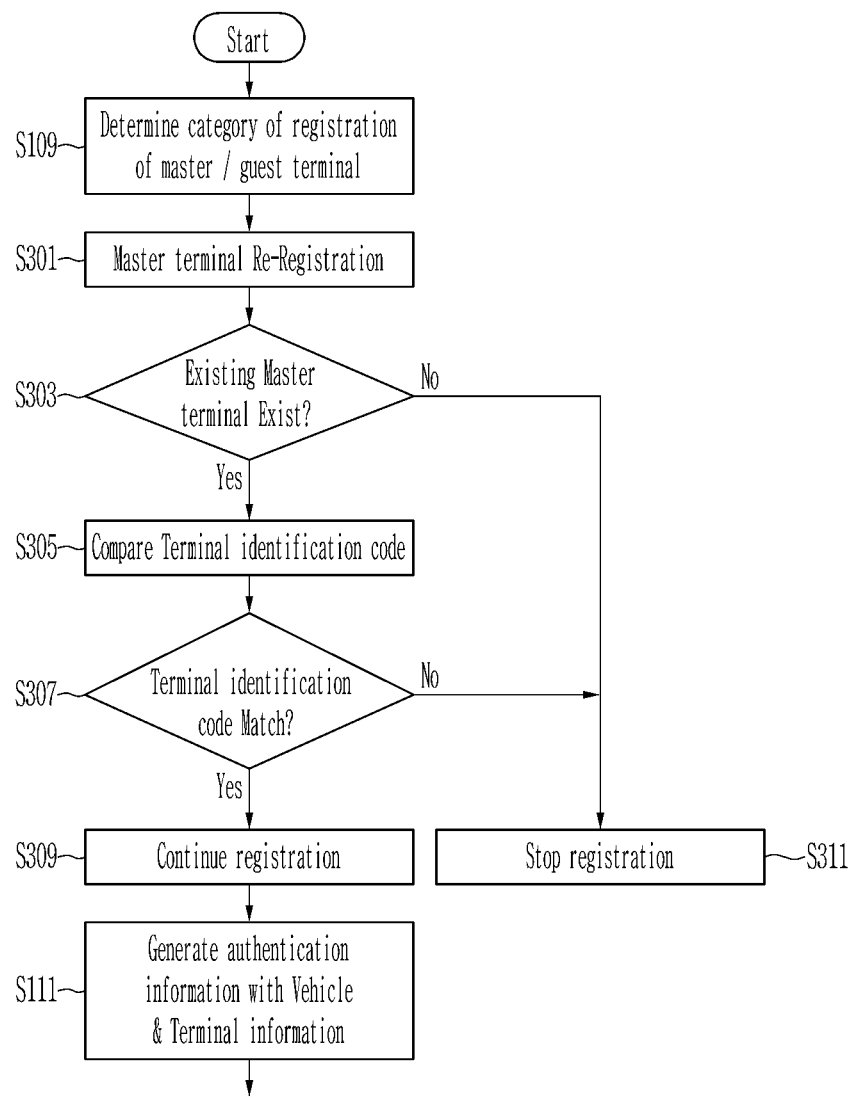
FIG. 6 is a flowchart schematically illustrating a re-registration of a master terminal in one form of the present disclosure.
Figure 7:
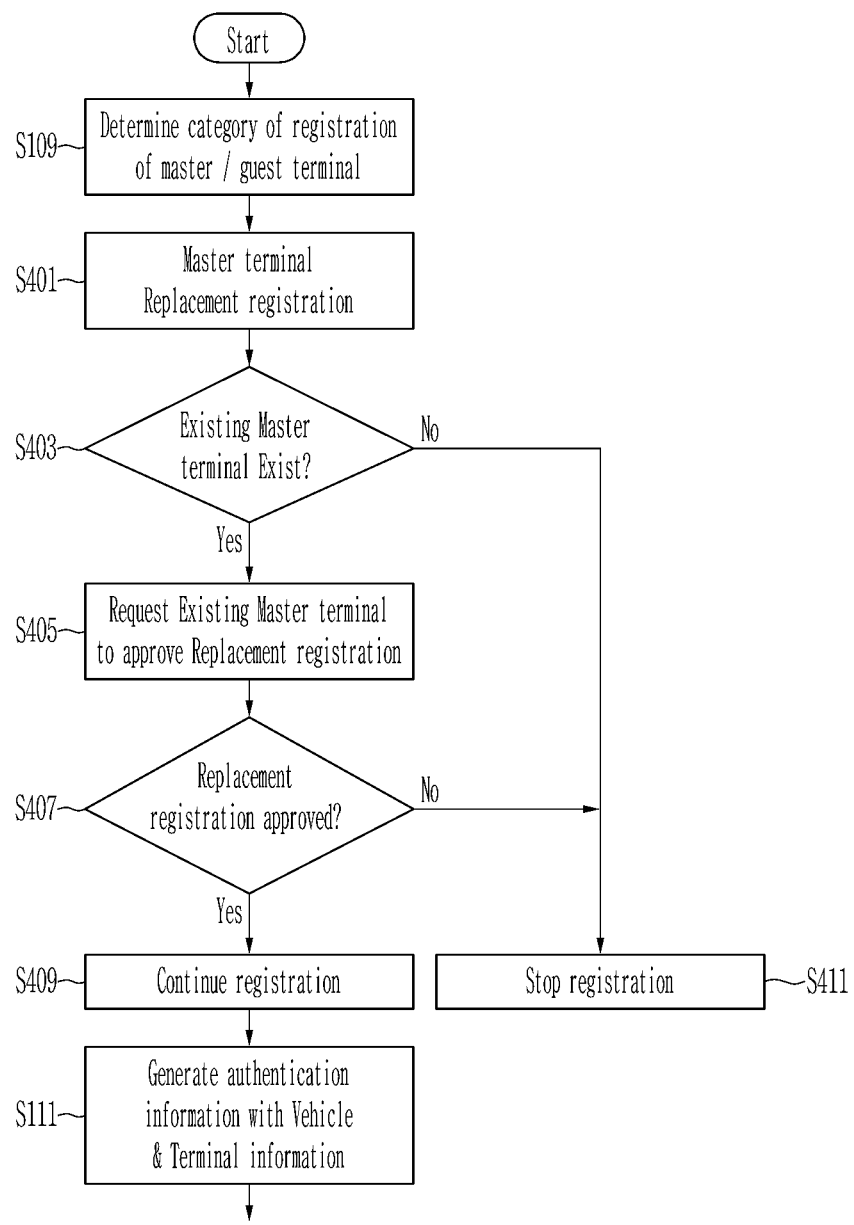
FIG. 7 is a flowchart schematically illustrating a replacing registration of master terminal in one form of the present disclosure.
Figure 8:
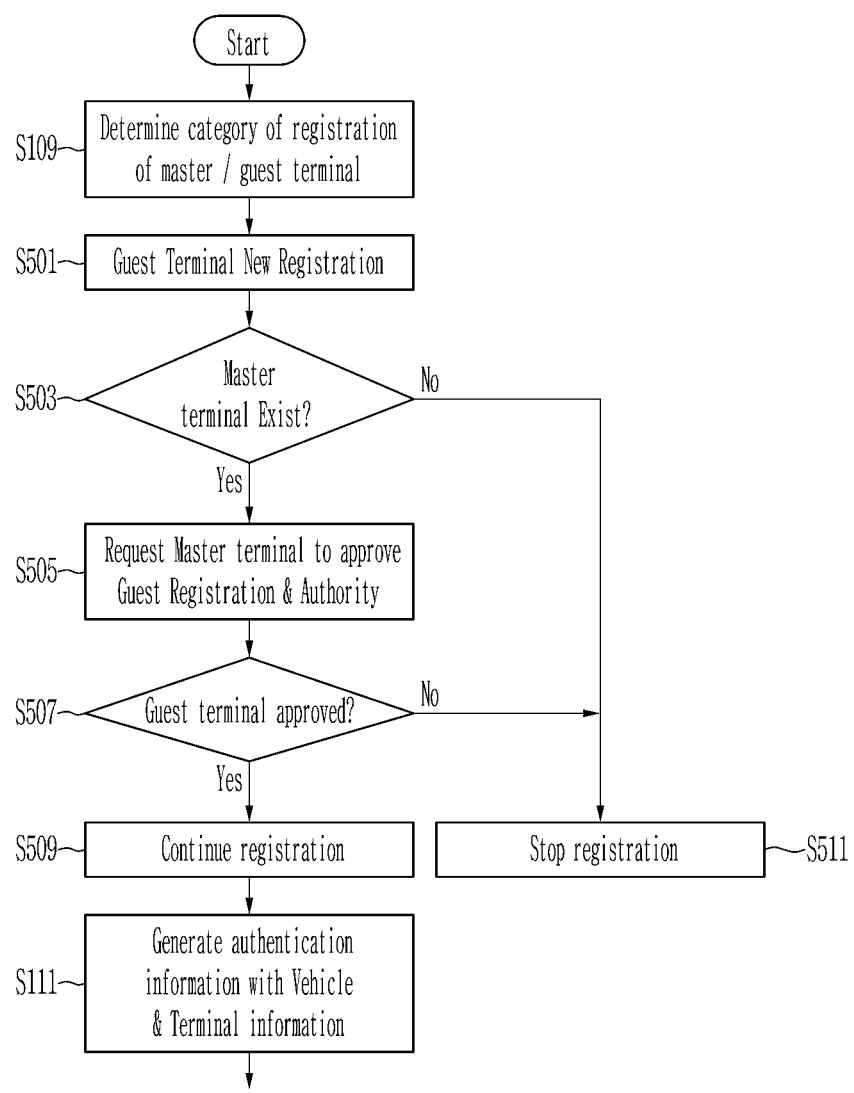
FIG. 8 is a flowchart schematically illustrating a new registration of a guest terminal in one form of the present disclosure.
Figure 9:
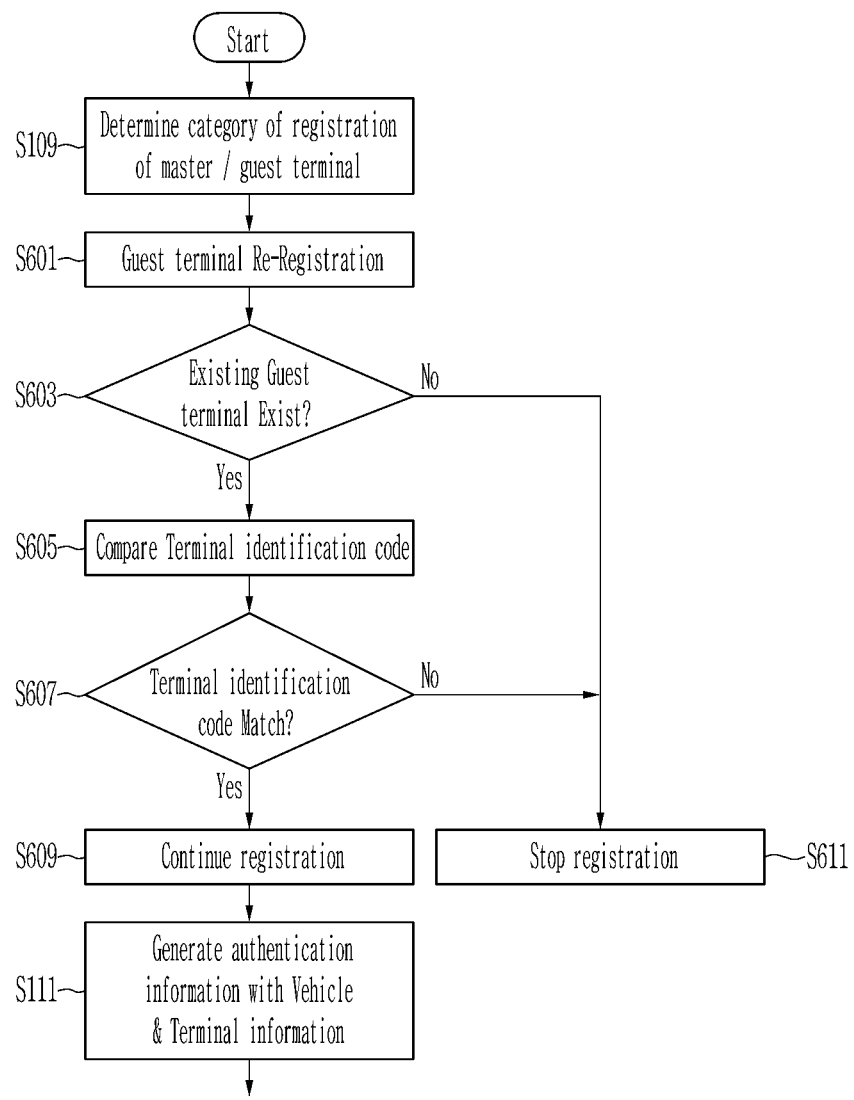
FIG. 9 is a flowchart schematically illustrating a re-registration of a guest terminal in one form of the present disclosure.

FIG. 4 is a flowchart schematically illustrating a connected vehicle control method in some forms of the present disclosure. FIG. 5 is a flowchart schematically illustrating a new registration of a master terminal in some forms of the present disclosure. FIG. 6 is a flowchart schematically illustrating a re-registration of a master terminal in some forms of the present disclosure. FIG. 7 is a flowchart schematically illustrating a replacing registration of master terminal in some forms of the present disclosure. FIG. 8 is a flowchart schematically illustrating a new registration of a guest terminal in some forms of the present disclosure. FIG. 9 is a flowchart schematically illustrating a re-registration of a guest terminal in some forms of the present disclosure.

Referring to FIG. 4, at step S101, the user application 12 is run on the user terminal 10, and the head unit 120 of the vehicle is also run for the connected control.

The head unit 120 is set with a password for operation. That is, in order to operate the head unit 120, a password for the operation must be input at step S103.

The password for the operation may be a PIN code consisting of six digits, and may be set as an initial password set at a vehicle production stage, a user specified password, and the like.

When the head unit 120 is driven for the first time, the password for the operation is set as the initial password. Upon entering the initial password, the head unit 120 prompts the user to enter a new password. The user enters a new password to set a user-designated password, and then the password for the operation of the head unit 120 is set to the user-designated password.

The initial password may be provided through a vehicle seller or the like when purchasing a vehicle. If the initial password or the user-designated password is lost, the operation of the head unit 120 may be restricted. In this case, in order to normally operate the head unit 120, the vehicle may be reset by visiting a vehicle seller or a service center.

Subsequently at step S105, the communication unit 110 of the vehicle is wirelessly connected to the user terminal 10 within a predetermined communication sensing distance.

Subsequently at step S107, the user application 12 transmits the information of the user terminal 10 to the communication unit 110, and the communication unit 110 receives the information of the user terminal 10. The information of the user terminal 10 includes a terminal identification code which is unique to each user terminal. For example, the terminal identification code may be a media access control (MAC) address.

The MAC address may consist of a total of 48 bits, and may be set differently for each terminal during terminal production.

Subsequently at step S109, the head unit 120 guides the user to select how to register the user terminal. In other words, at the step S109, the head unit 120 allows the user to determine a category of the registration.

The category of the registration may include, for example, a new registration of the master terminal, a re-registration of the master terminal, a replacing registration of the master terminal, a new registration of the guest terminal, a re-registration of the guest terminal, and deregistration of a registered user terminal.

The head unit 120 may register information of a plurality of user terminals, and store information of the plurality of user terminals differentiated into one master terminal 14 and at least one guest terminal 18.

Meanwhile, the head unit 120 may perform a new registration the user terminal. In addition, if the user terminal is already registered, the head unit 120 may perform a re-registration or a replacing registration.

When the category of the registration is determined, the communication unit 110 generates, at step S111, authentication information by combining the information of the user terminal 10 and the vehicle information.

The vehicle information includes a vehicle identification number (VIN) and a plurality of authentication keys, and the information of the user terminal 10 includes the terminal identification code.

In the prior art, only the vehicle information is included in generating the authentication information. In this case, there is a problem that a third party may acquire the control authority of the vehicle by stealing the authentication information through hacking or sniffing, or by copying a user application and performing authentication through a separate user terminal.

However, in some forms of the present disclosure, the authentication information includes the terminal identification code such as a MAC address, and therefore, the authentication cannot be performed through a separate user terminal even if the authentication information is stolen or the user application is duplicated. Since the terminal identification code is uniquely set for each terminal, the terminal identification code has a different value if the user terminal is different.

On the other hand, the vehicle information includes at least a vehicle identification number (VIN) and a plurality of authentication keys, and the plurality of authentication keys may include a real-time password authentication key such as a one-time password (OTP) authentication key that generates a password by combining temporal information. Some forms of the present disclosure may further improve the security of the authentication process through the use of the real-time password authentication key. It may be understood that the identification number may not necessarily numeric but may include a code such as characters or symbols that may identify the vehicle.

When the authentication information is generated, the head unit 120 generates the visible code by converting the authentication information at step S113. The visible code may be a Quick Response (QR) code that is a two-dimensional visible code.

Then, at step S115, the user scans the visible code through the user application 12.

At step S117, the user application 12 interprets the scanned visible code and loads the authentication information.

When the authentication information is loaded in the user application 12, it is determined whether the authentication information is valid at step S119. In some forms of the present disclosure, the validity of the authentication information may be determined by the user application 12 based on the loaded authentication information, or by the head unit 120 through communication with the user application 12.

When it is determined that the authentication information is valid, the user terminal 10 is registered in the head unit 120 at step S121. When the authentication information is determined to be invalid, the registration step is stopped at step S123. For example, when the terminal identification code of the user terminal and the terminal identification code included in the loaded authentication information do not match, the authentication information may be determined to be invalid.

After the user terminal 10 is registered in the head unit 120, the remote control function for the vehicle is activated in the user application 12 of the user terminal 10, at step S125. Accordingly, the user may remotely control the vehicle through the user application 12 of the user terminal 10 connected to the communication unit 110 of the vehicle within a predetermined communication sensing distance.

Referring to FIG. 5, when the head unit 120 guides the user to select how to register the user terminal at the step S109, the user may newly register the user terminal as a master terminal at step S201.

At step S203, the head unit 120 checks whether an already registered master terminal exists.

When the already registered master terminal exists, new registration is not repeated and the registration step is stopped at step S211.

When the already registered master terminal does not exist, the registration step proceeds at step S209, and for this purpose, the communication unit 110 generates the authentication information by combining information of the user terminal 10 and the vehicle information at the step S111.

Referring to FIG. 6, when the head unit 120 guides the user to select how to register the user terminal ate the step S109, the user may re-register the user terminal as a master terminal at step S301.

For example, in various cases, such as the case that the user application 12 malfunctions in the user terminal registered as a master terminal, or the case that the authentication information became lost by reinstalling the user application due to initialization of the master terminal, the user may re-register the user terminal as a master terminal.

At step S303, the head unit 120 checks whether an already registered master terminal exists.

When the already registered master terminal does not exist, re-registration is not performed, and the registration step is stopped at step S311.

When the already registered master terminal exists, the communication unit 110 compares, at step S305, the device identification code of the existing master terminal and the device identification code of the user terminal 10 to be re-registered, and checks, at step S307, whether the device identification code of the existing master terminal and the device identification code of the user terminal 10 to be re-registered match.

When the device identification code of the existing master terminal and the device identification code of the user terminal 10 to be re-registered do not match (S307—No), it is regarded as invalid re-registration and the registration step is stopped at step S311.

When the device identification code of the existing master terminal and the device identification code of the user terminal 10 to be re-registered match (S307—Yes), then the registration step proceeds at step S309. For this purpose, the communication unit 110 generates authentication information by combining the information of the user terminal 10 and the vehicle information at the step S111.

Referring to FIG. 7, when the head unit 120 guides the user to select how to register the user terminal at the step S109, the user may select a replacing registration of the user terminal as a master terminal, at step S401.

For example, another user terminal other than the user terminal already registered as a master terminal may be registered as a new master terminal by the replacing registration.

In this case, at step S403, the head unit 120 checks whether an already registered master terminal exists.

When the already registered master terminal does not exist, the replacing registration is not performed, and the registration step is stopped at step S411.

When the already registered master terminal exists, the communication unit 110 requests a master terminal replacing registration approval from the user application of the existing master terminal, at step S405.

When the replacing registration is not approved by the user application of the existing master terminal at step S407 (S407—No), it is regarded as an invalid replacing registration, and the registration step is stopped at step S411.

When the replacing registration is approved by the user application of the existing master terminal at the step S407 (S407—Yes), then the registration step proceeds at step S409. For this purpose, the communication unit 110 generates authentication information by combining the information of the user terminal 10 and the vehicle information at the step S111.

When a new user terminal is registered as the master terminal, the head unit 120 deregisters the existing already registered master terminal.

Referring to FIG. 8, when the head unit 120 guides the user to select how to register the user terminal at step S109, the user may newly register the user terminal as a guest terminal at step S501.

For example, a user terminal separate from the already registered master terminal may be registered as a guest terminal to the head unit. By such an arrangement, the control authority of the connected vehicle can be easily shared with others such as family or colleagues.

In this case, the user may designate a limited range of authority granted to the guest terminal. Particularly, the limited authority range can be set by limiting the permission period and the range of the remote control function that can be used. For example, the user may set the guest terminal to use only the door lock and unlock function for two months. When the registration period has elapsed, the registration of the guest terminal is released.

At step S503, the head unit 120 checks whether an existing master terminal is already registered.

When an already registered master terminal does not exist, a new registration of the guest terminal is not performed, and the registration step is stopped at step S511.

When the already registered master terminal exists in the communication unit, the communication unit 110 requests an approval of the guest terminal registration and an authority range setting, from the user application of the existing master terminal, at step S505.

When the new registration of the guest terminal is not approved by the user application of the existing master terminal at step S507, it is regarded as an invalid new registration, and the registration step is stopped at step S511.

When the user application of the existing master terminal approves the registration of the guest terminal and sets a limited authority range at step S507, the registration step proceeds at step S509. For this purpose, the communication unit 110 generates authentication information by combining the information of the user terminal 10 and the vehicle information at the step S111.

Referring to FIG. 9, when the head unit 120 guides the user to select how to register the user terminal at step S109, the user may re-register the user terminal as a guest terminal at step S601.

For example, the guest application 20 may be malfunctioning in the user terminal 18 registered as the guest terminal, or the authentication information may be lost when the guest application 20 is initialized and then reinstalled. In such a case, the user may re-register the user terminal 16 as a guest terminal. In this case, the limited authority range set may be maintained when the guest terminal is newly registered.

At step S603, the head unit 120 checks whether an already registered guest terminal exists.

When the already registered guest terminal does not exist, the re-registration is not performed, and the registration step is stopped at step S611.

When the already registered guest terminal exists, the communication unit 110 compares, at step S605, the device identification code of the existing guest terminal and the device identification code of the guest terminal 10 to be re-registered, and checks, at step S607 whether the device identification code of the existing guest terminal and the device identification code of the guest terminal 10 to be re-registered match.

When the device identification code of the existing guest terminal and the device identification code of the user terminal 10 to be re-registered do not match at step S607 (S607—No), it is considered an invalid re-registration and the registration step is stopped at step S611.

When the device identification code of the existing guest terminal and the device identification code of the user terminal 10 to be re-registered match at step S607 (S607—Yes), the registration step proceeds at step S609. For this purpose, the communication unit 110 generates authentication information by combining the information of the user terminal 10 and the vehicle information at the step S111.

Figure 10:
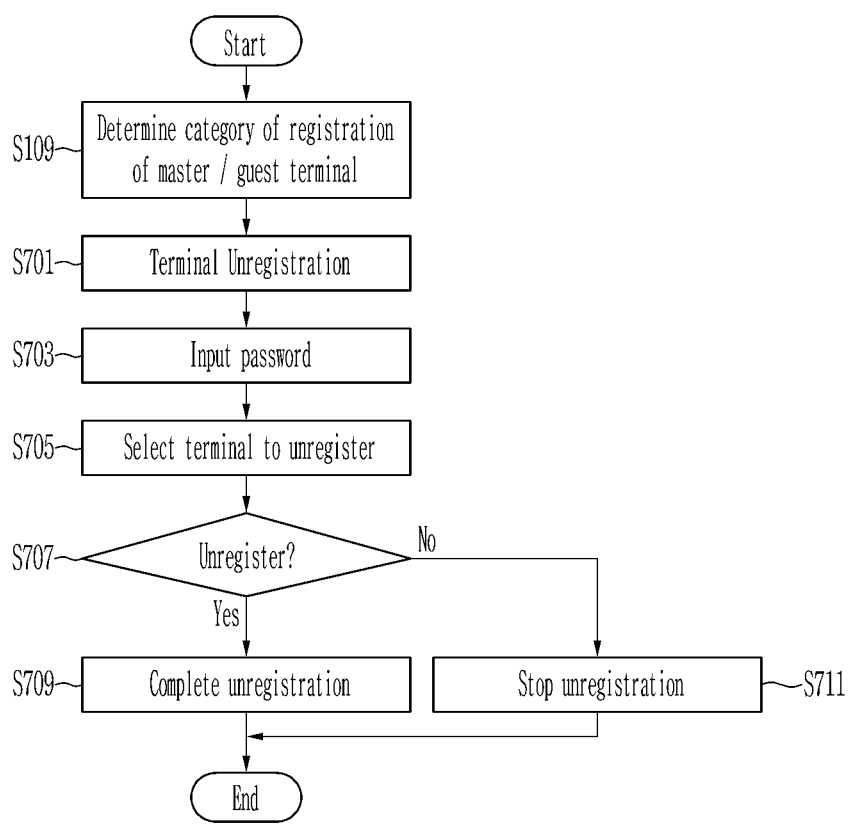
FIG. 10 is a flowchart schematically illustrating a deregistration in one form of the present disclosure.

FIG. 10 is a flowchart schematically illustrating deregistration of a user terminal in some forms of the present disclosure.

Referring to FIG. 10, when the head unit 120 guides the user to select how to register the user terminal at the step S109, the head unit 120 may proceed with deregistration of an already registered user terminal at step S701.

Firstly at step S703, the head unit 120 guides to enter a password for operation to a user terminal connected with the head unit 120. The user terminal may be a registered master terminal or a registered guest terminal.

The head unit 120 may determine whether the user is an authorized user based on the received password.

Thereafter, the head unit 120 guides the user terminal to select which user terminal is to be deregistered from among the already registered user terminals, and receives information of the user terminal to be deregistered at step S705.

When a user terminal to be deregistered is selected, the head unit 120 checks confirmation of deregistration from the user terminal at step S707.

Here, the head unit 120 may alert the user terminal by guiding that cancellation is impossible when the registration is deregistered.

In particular, when the registration of the master terminal is deregistered, the head unit 120 may output a warning message to reconsider the deregistration unless the master terminal is lost or became out of order since new registration, re-registration, or replacing registration of the master terminal will not be easy.

When the user selects cancelation of deregistration at step S707 (S707—No), the deregistration step is stopped at step S711.

When the user selects to proceed with the deregistration at step S709 (S707—Yes), the head unit 120 deletes the information of the user terminal, and the user application 12 deletes the vehicle information to complete the deregistration at step S709.

Meanwhile, when the master terminal is deregistered, the head unit 120 may proceed with deregistration with respect to the guest terminals.

Alternatively, even if the master terminal is deregistered, the head unit 120 may maintain registration of guest terminals. In this case, the guest terminals are deregistered when the registration period according to the limited authority range described above is exceeded.

In the above description, various operations are described to be performed by specific elements such as the head unit 120 and the communication unit 110, however, it should not be understood that the described operations must be performed by the described elements. Rather, it may be understood that such a description is for better understanding and better enablement. it may be understood that the controller 150 may centrally control the various operations, and thus the controller 150 performs such various operation by utilizing the described elements.

For example, in some forms of the present disclosure described above, the communication unit 110 is assumed to be a BLE module, but is not limited thereto and may be implemented through other short-range communication modules.

For example, the communication unit 110 may also be implemented by at least one of Wifi, wireless LAN, radio frequency (RF), and ZigBee which is capable of performing short-range communication with the user terminal 10 by the RF and LF antennas which are simultaneously implemented.

Therefore, there is an advantage that a smartkey-free start service may be variously performed according to communication type compatible with the type of user terminal 10.

The above-mentioned forms of the present disclosure are not embodied only by an apparatus and/or method. Alternatively, the above-mentioned forms may be embodied by a program performing functions, which correspond to the configuration of some forms of the present disclosure, or a recording medium on which the program is recorded. These forms of the present disclosure can be easily devised from the description of the above-mentioned forms by those skilled in the art to which the present disclosure pertains.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DESCRIPTION OF SYMBOLS

10: user terminal
12: user application
100: vehicle control system
110: communication unit
111: RF antenna
112: LF antenna
113: communication control module
120: head unit
130: body control module
140: start-stop button
150: controller

What is claimed is:

1. A system for connected vehicle control, comprising:
a communicator configured to:
 connect with a user terminal though a wireless communication; and
 generate authentication information by combining user terminal information and vehicle information, wherein the vehicle information includes at least one of a vehicle identification number or a plurality of authentication keys, and the user terminal information includes at least a terminal identification code defined uniquely for each user terminal;
a head unit having a password and configured to generate a visible code by converting the authentication information;
a body controller configured to:
 control a vehicle based on a remote control signal sent according to a remote control function of a user application installed in the user terminal, wherein the user application is configured to scan the visible code, load the authentication information, register the vehicle information, and remote control the vehicle with the registered vehicle information; and
a controller configured to:
 connect the communicator, the head unit, and the user application through the wireless communication; and
 authenticate and register,
wherein the communicator is configured to receive the remote control signal by activating the remote control function through the wireless communication after the head unit registers the user terminal and the user application registers the vehicle information, and
wherein the head unit is further configured to:
 register a plurality of user terminals;
 register or deregister separately the plurality of user terminals into one master terminal and a plurality of guest terminals; and
 categorize a registration process into a new registration, a re-registration, and a replacing registration.

2. The system of claim 1, wherein, when the user terminal is newly registered as the master terminal, the controller is configured to:
 check whether a pre-registered master terminal exists in the head unit;
 register the user terminal as the master terminal when the pre-registered master terminal does not exist; and not register the user terminal as the master terminal when the pre-registered master terminal exists.

3. The system of claim 1, wherein, when the user terminal is re-registered as the master terminal, the controller is configured to:
check whether the pre-registered master terminal exists in the head unit;
when the pre-registered master terminal exists, check whether the terminal identification code of the pre-registered master terminal is identical to the terminal identification code of the user terminal;
re-register the user terminal as the master terminal when the terminal identification code of the pre-registered master terminal is identical to the terminal identification code of the user terminal; and
not re-register the user terminal as the master terminal when the pre-registered master terminal does not exist or the terminal identification code of the pre-registered master terminal is not identical to the terminal identification code of the user terminal.

4. The system of claim 1, wherein, when the user terminal is replacing-registered as the master terminal, the controller is configured to:
check whether the pre-registered master terminal exists in the head unit;
send a request for the replacing registration to a master application installed in the pre-registered master terminal when the pre-registered master terminal exists;
replacing-register the user terminal as the master terminal, when the replacing registration is approved;
not replacing-register when the pre-registered master terminal does not exist or the replacing registration is not approved; and
deregister the pre-registered master terminal when the user terminal is replacing-registered as the master terminal.

5. The system of claim 1, wherein, when the user terminal is newly registered as the guest terminal, the controller is configured to:
check whether the pre-registered master terminal exists in the head unit;
send, a request for the new registration of the guest terminal and a limited authority range setting to a master application of the pre-registered master terminal when the pre-registered master terminal exists;
register the user terminal as the guest terminal when the new registration of the guest terminal is approved and the limited authority range is set; and
not register the user terminal as the guest terminal when the pre-registered master terminal does not exist or the new registration is not approved,
wherein the limited authority range comprises a permission period of the guest terminal and a permitted range of the remote control function activated by a guest application installed in the guest terminal.

6. The system of claim 1, wherein, when the user terminal is re-registered as the guest terminal, the controller is configured to:
check whether at least one of a pre-registered guest terminal exists in the head unit;
check whether the terminal identification code of the pre-registered guest terminal is identical to the terminal identification code of the user terminal when the pre-registered guest terminal exists;
re-register the user terminal as the guest terminal when the terminal identification code of the pre-registered guest terminal is identical to the terminal identification code of the user terminal; and
not re-register the user terminal as the guest terminal when the terminal identification code of the pre-registered guest terminal is not identical to the terminal identification code of the user terminal.

7. The system of claim 1, wherein, when the user terminal registered in the head unit is deregistered, the controller is configured to:
delete the user terminal information from the head unit; and
delete the vehicle information from the user application.

8. The system of claim 1, wherein the head unit is further configured to:
set an initial password at a vehicle production stage as the password; and
set a user-designated password as the password when the user-designated password is received from the user application after the initial password is input.

9. The system of claim 1, wherein, when Bluetooth Low Energy is implemented in the communicator, the communicator further comprises:
at least one communication antenna configured to radiate a signal to an outside and an inside of the vehicle to connect the wireless communication with the user application; and
a communication controller configured to:
receive, from the user application, the remote control signal; and
transmit, to the body controller, the received remote control signal when the user application is registered in the head unit.

10. The system of claim 1, wherein:
the terminal identification code is a media access control address, and
the plurality of authentication keys includes a one-time password authentication key.

11. A connected vehicle control method for controlling a connected vehicle control system, the method comprising:
connecting, by a communicator, with a user terminal through a wireless communication;
receiving, by the communicator, user terminal information from a user application;
receiving, by a head unit, a password from the user terminal and storing the received password;
determining, by the head unit, a registration category;
generating, by the communicator, authentication information by combining vehicle information and the user terminal information;
generating, by the head unit, a visible code by converting the authentication information;
displaying the visible code through the head unit; and
registering, by the head unit, the user terminal when the user application scans the visible code and loads the authentication information,
wherein the vehicle information comprises at least vehicle identification number or a plurality of authentication keys, and
wherein the user terminal information comprise at least a terminal identification code unique to each terminal.

12. The method of claim 11, wherein, when the registration category is a new registration of a master terminal, the method further comprises:
determining whether a pre-registered master terminal exists;
when the pre-registered master terminal does not exist, generating the authentication information; and when the pre-registered master terminal exists, not newly registering the master terminal.

13. The method of claim 11, wherein, when the registration category is a re-registration of the master terminal, the method further comprises:
determining whether the pre-registered master terminal exists;
checking whether a device identification code of the pre-registered master terminal is identical to a device identification code of the user terminal;
when the pre-registered master terminal exists and the device identification code of the pre-registered master terminal is identical to the device identification code of the user terminal, generating the authentication information; and
when the pre-registered master terminal does not exist or when the device identification code of the pre-registered master terminal is not identical to the device identification code of the user terminal, not re-registering the master terminal.

14. The method of claim 11, wherein, when the registration category is a replacing-registration of the master terminal, the method further comprises:
determining whether the pre-registered master terminal exists;
sending a request for the replacing-registration to the user application of the pre-registered master terminal;
receiving an approval of the replacing registration from the user application of the pre-registered master terminal;
when the pre-registered master terminal exists and the replacing registration is approved by the user application of the pre-registered master terminal, generating the authentication information; and
when the pre-registered master terminal does not exist or the replacing registration is not approved by the user application of the pre-registered master terminal, not replacing-registering the master terminal.

15. The method of claim 11, wherein, when the registration category is a new registration of a guest terminal, the method further comprises:
determining whether a pre-registered master terminal exists;
sending a request for an approval of registering the guest terminal to the user application of the pre-registered master terminal;
receiving a limited authority range setting permitted to the guest terminal from the user application of the pre-registered master terminal;
receiving the approval of registering the guest terminal from the user application of the pre-registered master terminal;
when the pre-registered master terminal exists and the registration of the guest terminal is approved, generating the authentication information; and
when the pre-registered master terminal does not exist or the registration of the guest terminal is not approved, not registering the guest terminal,
wherein the limited authority range comprises a permission period of the guest terminal and a permitted range of the remote control function activated by a guest application installed in the guest terminal.

16. The method of claim 11, wherein, when the registration category is a re-registration of the guest terminal, the method further comprises:
checking whether a pre-registered guest terminal exists;
checking whether a device identification code of the pre-registered guest terminal is identical to a device identification code of the user terminal;
when the pre-registered guest terminal exists and the device identification code of the pre-registered guest terminal is identical to the device identification code of the user terminal, generating the authentication information; and
when the pre-registered guest terminal does not exist or the device identification code of the pre-registered guest terminal is not identical to the device identification code of the user terminal, not re-registering the guest terminal.

17. The method of claim 11, wherein, when the registration category is a deregistration of a registered user terminal, the method further comprises:
receiving the password from the user;
checking an authorized user based on the received password;
selecting a user terminal to be deregistered from at least one registered terminal; and
deleting the user terminal information selected by the user.

18. The method of claim 11, wherein the method comprises:
receiving an initial password set in a vehicle production stage as the password when the head unit is initially driven;
guiding the user to input a user-designated password when the initial password is correctly input; and
setting the user-designated password as the password when the user-designated password is received.

19. The method of claim 11, wherein:
the terminal identification code is a media access control address, and
the plurality of authentication keys comprises a one-time password authentication key.

* * * * *